United States Patent
Aravamudhan et al.

(10) Patent No.: US 10,334,419 B2
(45) Date of Patent: Jun. 25, 2019

(54) METHODS, SYSTEMS, AND COMPUTER READABLE MEDIA FOR OPTIMIZING MACHINE TYPE COMMUNICATION (MTC) DEVICE SIGNALING

(71) Applicant: Oracle International Corporation, Redwood Shores, CA (US)

(72) Inventors: Venkatesh Aravamudhan, Bangalore (IN); Raghuvamshi vasudev Singh Thakur, Bangalore (IN); Nitin Gupta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/679,124

(22) Filed: Aug. 16, 2017

(65) Prior Publication Data
US 2019/0058962 A1 Feb. 21, 2019

(51) Int. Cl.
*H04W 4/00* (2018.01)
*H04W 4/70* (2018.01)
(Continued)

(52) U.S. Cl.
CPC ............... *H04W 4/70* (2018.02); *H04L 45/24* (2013.01); *H04L 45/28* (2013.01); *H04W 68/02* (2013.01);
(Continued)

(58) Field of Classification Search
CPC ....... H04W 4/70; H04W 76/11; H04W 68/02; H04W 72/0413; H04W 76/14; H04L 45/28; H04L 45/24
See application file for complete search history.

(56) References Cited

U.S. PATENT DOCUMENTS 9,432,150 B2   8/2016  Jain et al.
9,467,508 B2   10/2016 Xu
(Continued)

FOREIGN PATENT DOCUMENTS

EP    3 018 946 A1    5/2016
WO   WO 2016/156549 A1   10/2016
(Continued)

OTHER PUBLICATIONS

Commonly-assigned, co-pending U.S. Appl. No. 15/804,974 for "Methods, Systems, and Computer Readable Media for using Authentication Validation Time Periods," (Unpublished, filed Nov. 6, 2017).
(Continued)

*Primary Examiner* — Clemence S Han
(74) *Attorney, Agent, or Firm* — Jenkins, Wilson, Taylor & Hunt P.A.

(57) ABSTRACT

A method includes establishing, by a machine type communication (MTC) accumulator, a first direct communication path tunnel with a eNodeB and a second direct communication path tunnel with a MTC application server (AS), receiving, by the eNodeB, radio resource control (RRC) packet containing MTC data as a payload from a MTC UE device over an established radio bearer link, and locating, by the eNodeB, a MTC data forwarding indicator included in the RRC packet. In response to locating the MTC data forwarding indicator included in the RRC packet, forwarding the MTC Data to the MTC accumulator and facilitating, by the MTC accumulator, a MTC communication session between the MTC UE device and the MTC application server identified by a MTC application server identifier contained in the MTC data over the established first and second direct communication paths.

17 Claims, 4 Drawing Sheets

(51) Int. Cl.
*H04L 12/707* (2013.01)
*H04W 72/04* (2009.01)
*H04L 12/703* (2013.01)
*H04W 68/02* (2009.01)
*H04W 76/11* (2018.01)
*H04W 76/14* (2018.01)

(52) U.S. Cl.
CPC ........ *H04W 72/0413* (2013.01); *H04W 76/11* (2018.02); *H04W 76/14* (2018.02)

(56) References Cited

U.S. PATENT DOCUMENTS

| | | | |
|---|---|---|---|
| 9,621,450 B2 | 4/2017 | Jeong et al. | |
| 2012/0207113 A1* | 8/2012 | Yoon | H04W 4/70 370/329 |
| 2013/0044596 A1* | 2/2013 | Zhi | H04W 48/06 370/230 |
| 2013/0080782 A1 | 3/2013 | Rajadurai et al. | |
| 2013/0272247 A1* | 10/2013 | Guo | H04W 76/32 370/329 |
| 2013/0336305 A1* | 12/2013 | Yan | H04B 7/024 370/338 |
| 2014/0078968 A1 | 3/2014 | Korhonen et al. | |
| 2014/0086214 A1* | 3/2014 | Hong | H04W 4/70 370/332 |
| 2014/0089442 A1* | 3/2014 | Kim | H04L 51/38 709/206 |
| 2014/0153391 A1 | 6/2014 | Ludwig et al. | |
| 2014/0334386 A1* | 11/2014 | Fukumasa | H04W 4/08 370/328 |
| 2014/0376426 A1* | 12/2014 | Boudreau | H04L 47/41 370/294 |
| 2014/0376454 A1* | 12/2014 | Boudreau | H04W 4/70 370/329 |
| 2015/0036591 A1 | 2/2015 | Cao et al. | |
| 2015/0055459 A1 | 2/2015 | Wong et al. | |
| 2015/0067328 A1 | 3/2015 | Yin | |
| 2015/0111574 A1* | 4/2015 | Fukumasa | H04W 4/06 455/435.1 |
| 2015/0256440 A1 | 9/2015 | Jeong et al. | |
| 2015/0319172 A1 | 11/2015 | Zhang et al. | |
| 2016/0007138 A1 | 1/2016 | Palanisamy et al. | |
| 2016/0007170 A1 | 1/2016 | Vaidya et al. | |
| 2016/0085594 A1 | 3/2016 | Wang et al. | |
| 2016/0142860 A1 | 5/2016 | Kim et al. | |
| 2016/0277243 A1 | 9/2016 | Kim et al. | |
| 2016/0277530 A1 | 9/2016 | Jung et al. | |
| 2016/0337127 A1 | 11/2016 | Schultz et al. | |
| 2016/0337841 A1 | 11/2016 | Won et al. | |
| 2017/0126512 A1 | 5/2017 | Seed et al. | |
| 2017/0295557 A1 | 10/2017 | Chamarty et al. | |
| 2017/0318570 A1 | 11/2017 | Shaw et al. | |
| 2017/0347283 A1 | 11/2017 | Kodaypak | |
| 2018/0035351 A1 | 2/2018 | Kodaypak | |
| 2018/0092133 A1 | 3/2018 | Starsinic et al. | |
| 2018/0109941 A1 | 4/2018 | Jain et al. | |
| 2018/0124544 A1 | 5/2018 | Gupta et al. | |
| 2018/0234291 A1 | 8/2018 | Mathison et al. | |
| 2018/0241615 A1 | 8/2018 | Livanos et al. | |
| 2018/0248711 A1 | 8/2018 | McCann | |
| 2018/0249281 A1 | 8/2018 | McCann | |
| 2018/0249282 A1 | 8/2018 | McCann | |
| 2018/0263013 A1 | 9/2018 | Jain et al. | |
| 2019/0021121 A1 | 1/2019 | Aravamudhan et al. | |

FOREIGN PATENT DOCUMENTS

| | | |
|---|---|---|
| WO | WO 2016/200357 A1 | 12/2016 |
| WO | WO 2017/017879 A1 | 2/2017 |
| WO | WO 2018/156318 A1 | 8/2018 |
| WO | WO 2018/156319 A1 | 8/2018 |
| WO | WO 2018/156320 A1 | 8/2018 |
| WO | WO 2019/014505 | 1/2019 |
| WO | WO 2019/090270 A1 | 5/2019 |

OTHER PUBLICATIONS

"Universal Mobile Telecommunications System (UMTS); LTE; Diameter-based T4 Interface for communications with packet data networks and applications (3GPP TS 29.337 V14.2.0 Release 14),"ETSI TS 129 337 V14.2.0, pp. 1-25 (Oct. 2017).

Commonly-assigned, co-pending U.S. Appl. No. 15/649,627 for "Methods, Systems, and Computer Readable Media for Dynamically Provisioning Session Timeout Information in a Communications Network," (Unpublished, filed Jul. 13, 2017).

"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).

Commonly-assigned, co-pending U.S. Appl. No. 15/604,132 for "Methods, Systems and Computer Readable Media for Providing Integrated Service Capability Exposure Function (SCEF), Service Capability Server (SCS) and Application Server (AS) Services," (Unpublished filed May 24, 2017).

"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).

"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).

"LTE;General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).

Commonly-assigned, co-pending U.S. Appl. No. 15/499,847 for "Methods, Systems and Computer Readable Media for Providing Service Capability Exposure Function (SCEF) as a Diameter Routing Agent (DRA) Feature," (Unpublished, filed Apr. 27, 2017).

Commonly-assigned, co-pending U.S. Appl. No. 15/608,595 for "Methods, Systems and Computer Readable Media for Providing Service Capability Exposure Function (SCEF) as a Cloud Service," (Unpublished, filed May 30, 2017).

"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).

"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).

"3rd Generation Partnership Project; Technical Specification Group Services and System Aspects; Architecture enhancements to facilitate communications with packet data networks and applications (Release 14)," 3GPP TS 23.682, V14.2.0, pp. 1-104 (Dec. 2016).

Abu-Lebdeh et al., "A Virtual Network PaaS for 3GPP 4G and Beyond Core Network Services," pp. 1-7 (Aug. 20, 2016).

"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).

"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).

"Digital cellular telecommunications system (Phase 2+) (GSM); Universal Mobile Telecommunications System (UMTS); LTE; Archi-

(56) References Cited

OTHER PUBLICATIONS tecture enhancements to facilitate communications with packet data networks and applications (3GPP TS 23.682 V13.4.0 Release 13)," ETSI TS 123 682 V13.4.0, pp. 1-82 (Mar. 2016).
"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; Tsp interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).
Taleb et al., "Virtualizing the LTE Evolved Packet Core (EPC)," Proc. European Conf. on Networks and Communications (EUCNC), pp. 1-2 (Jun. 2014).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).
Non-Final Office Action for U.S. Appl. No. 15/804,974 (dated May 10, 2018).
Notification of Transmittal of the International Search Report and the Written Opinion of the International Searching Authority, or the Declaration for International Application No PCT/US2018/016044 (dated Apr. 24, 2018).
Notification of Transmittal of the International Search Report and the Written Opinion of the International Searching Authority, or the Declaration for International Application No. PCT/US2018/016047 (dated Apr. 24, 2018).
Notification of Transmittal of the International Search Report and the Written Opinion of the International Searching Authority, or the Declaration for International Application No. PCT/US2018/016045 (dated Apr. 24, 2018).
"Change Request," InterDigital, Meeting ARC#25, Doc# ARC-2016-0439-TS-0026_sec5_sec6.1, pp. 1-16 (Oct. 17, 2016).
"Universal Mobile Telecommunications System (UMTS); LTE; Home Subscriber Server (HSS) diameter interfaces for interworking with packet data networks and applications (3GPP TS 29.339 version 13.3.0 Release 13),", ETSI TS 129 336 V13.3.0, pp. 1-56 (Apr. 2016).
"Routing Non-IP Data to/from Multiple UE Applicatons and Multiple SCS/AS's," Convida Wireless, 3FPP TSG-SA WG2 #113AH, pp. 1-6 (Feb. 2016).
Notice of Allowance and Fee(s) Due for U.S. Appl. No. 15/804,974 (dated Nov. 13, 2018).

Non-Final Office Action for U.S. Appl. No. 15/604,132 (dated Oct. 2, 2018).
Non-Final Office Action for U.S. Appl. No. 15/499,847 (dated Oct. 2, 2018).
Commonly-assigned, co-pending U.S. Appl. No. 16/121,203 for "Methods, Systems and Computer Readable Media for Overload and Flow Control at a Service Capability Exposure Function (SCEF)," (Unpublished filed Sep. 4, 2018).
Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).
"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).
Commonly-assigned, co-pending U.S. Appl. No. 15/990,196 for "Methods, Systems, and Computer Readable Media for Detecting and Mitigating Effects of Abnormal Behavior of a Machine Type Communication (MTC) Device," (Unpublished, filed May 25, 2018).
"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).
"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).
Donovan, "Diameter Routing Message Priority," RFC 7944, pp. 1-18 (Aug. 2016).
Non-Final Office Action for U.S. Appl. No. 15/608,595 (dated Jan. 8, 2019).
Notification of Transmittal of the International Search Report and the Written Opinion of the International Searching Authority, or the Declaration for International Application Serial No. PCT/US2018/041911 (dated Oct. 12, 2018).
Non-Final Office Action for U.S. Appl. No. 15/649,627 (dated Jan. 23, 2019).
Applicant-Initiated Interview Summary for U.S. Appl. No. 15/499,847 (dated Jan. 22, 2019).
Applicant-Initiated Interview Summary for U.S. Appl. No. 15/604,132 (dated Jan. 22, 2019).
Final Office Action for U.S. Appl. No. 15/608,595 (dated Apr. 29, 2019).
Applicant-Initiated Interview Summary for U.S. Appl. No. 15/608,595 (dated Apr. 22, 2019).
Notice of Allowance and Fee(s) Due U.S. Appl. No. 15/499,847 (dated Apr. 17, 2019).
Final Office Action for U.S. Appl. No. 15/604,132 (dated Apr. 16, 2019).

* cited by examiner

METHODS, SYSTEMS, AND COMPUTER READABLE MEDIA FOR OPTIMIZING MACHINE TYPE COMMUNICATION (MTC) DEVICE SIGNALING

TECHNICAL FIELD

The subject matter described herein relates to methods and systems for managing communications conducted by machine type communication (MTC) devices. More particularly, the subject matter described herein relates to methods, systems, and computer readable media for optimizing MTC device signaling.

BACKGROUND

At present, the telecommunications industry anticipates that millions of MTC devices catering to variety of use cases that will impose a significant burden on telecommunication networks in the near future. This influx of MTC devices introduces a huge opportunity and unseen challenges for telecommunications industry. Current narrowband Internet of Things (NB-IoT) enhancements in LTE networks permit MTC servers to use existing LTE procedures and infrastructure to facilitate communications involving MTC devices. Notably, existing connectivity with a MTC device still relies on LTE and 3GPP based procedures, which may not necessarily be needed for devices that frequently send and receive small amount amounts of data to an application server (AS).

More specifically, data connectivity for MTC devices at present requires complex LTE procedures for simple transmissions containing miniscule data to a MTC application server. Notably, existing procedures exhibit an unnecessary amount of signaling traffic exchange to setup a communication path between a MTC device and a MTC application server as compared to the associated transaction time needed. For example, a smart electricity meter MTC device that typically sends a few kilobytes (KBs) of data in milliseconds may have to wait for five seconds for a communication path to be established. Moreover, the amount of signaling triggered for establishing a communication path by the continuously increasing number of MTC devices might necessitate the re-dimensioning of the entire LTE network. Notably, the proportion of latency and setup times as compared to the small data transfer gives notion of the inefficient use of the LTE network.

Accordingly, there is a need for methods, systems, and computer readable media for optimizing MTC device signaling.

SUMMARY

Methods, systems, and computer readable media for optimizing machine type communication (MTC) device signaling are disclosed. In some embodiments, the method includes establishing, by a machine type communication (MTC) accumulator, a first direct communication path tunnel with an evolved node B (eNodeB) and a second direct communication path tunnel with a MTC application server (AS), receiving, by the eNodeB, radio resource control (RRC) packet containing MTC data as a payload from a MTC UE device over an established radio bearer link, and locating, by the eNodeB, a MTC data forwarding indicator included in the RRC packet. In response to locating the MTC data forwarding indicator included in the RRC packet, forwarding the MTC Data to the MTC accumulator and facilitating, by the MTC accumulator, a MTC communication session between the MTC UE device and the MTC application server identified by a MTC application server identifier contained in the MTC data over the established first and second direct communication paths.

In some embodiments, the system includes a MTC accumulator configured for establishing a first direct communication path tunnel with an evolved nodeB and a second direct communication path tunnel with a MTC application server. The system also includes an eNodeB configured to receive a radio resource control (RRC) packet containing MTC data as a payload from a MTC user equipment (UE) device over an established radio bearer link, to locate a MTC data forwarding indicator included in the RRC packet, to forward the MTC Data to the MTC accumulator in response to locating the MTC data forwarding indicator included in the RRC packet, wherein a MTC communication session between the MTC UE device and the MTC application server identified by a MTC application server identifier contained in the MTC data is facilitated by the MTC accumulator over the established first and second direct communication paths.

The subject matter described herein can be implemented in software in combination with hardware and/or firmware. For example, the subject matter described herein can be implemented in software executed by a processor. In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms 'node' refers to a physical computing platform including one or more processors and memory.

As used herein, the terms 'engine', 'manager', or 'function' can refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
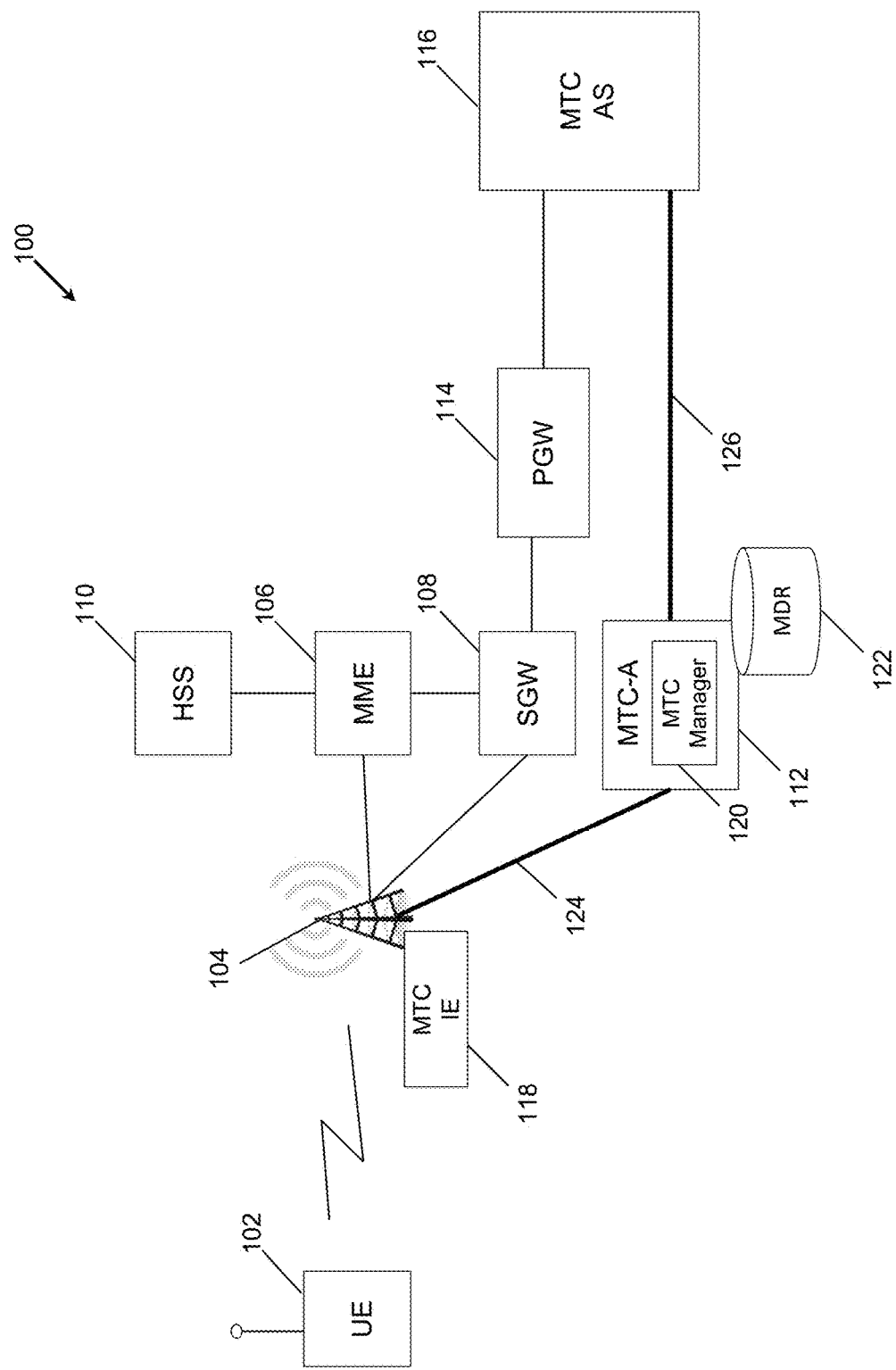
FIG. 1 is a block diagram illustrating an exemplary system configured for optimizing machine type communication (MTC) device signaling in accordance to an embodiment of the subject matter described herein.

The subject matter described herein relates to methods, systems, and computer readable media for optimizing machine type communication (MTC) device signaling. In some embodiments, a MTC accumulator device is introduced as a new network element that is configured to establish persistent data tunnels that serve as a direct and secure connection to each of an eNodeB and a MTC application server. Such persistent tunnels may be used by the MTC accumulator to facilitate a communications session between a MTC UE device and an associated MTC application server via the eNodeB and the MTC accumulator. Notably, the MTC data (e.g., water meter readings, electrical meter readings, other small-sized (e.g., kilobyte sized) data readings or measurements, etc.) communicated from the MTC UE device (and/or MTC application server) traverses a bearer path that bypasses all other network elements in the evolved packet core (EPC) network (e.g., the SGW, PGW, SCS, etc.), thereby deviating from communications paths established by LTE and 3GPP procedures, standards, and/or protocols.

LTE network deployments are presently assisting billions of subscribers connect to and over wireless networks. Prevalent use of LTE networks is enabling the telecommunications industry to continue the expansion into the Internet of Things (IoT) space and to support MTC use cases. MTC device characteristics are different to the characteristics exhibited by traditional mobile devices. Notably, MTC user equipment devices can be characterized as instruction-driven with very little human interaction. Additionally, MTC UE devices can be characterized into different categories based on industry and use case. For example, MTC devices that enable smart lighting are classified as stationary, whereas fleet management devices are classified for their mobility based on their frequent change locations. Examples of a MTC UE device includes, but is not limited to a wireless smart electricity meter, a wireless smart water meter, an Internet of things (IoT) device, a machine-to-machine (M2M) device, or any other like device.

MTC related improvements to the LTE infrastructure have are currently facilitated entirely in accordance to 3GPP standards. For example, MTC UE devices can operate over an LTE network to communicate with a MTC-IWF node and/or SCEF node to reach a destination MTC-AS for various IoT based use cases. The 3GPP standard defines two different ways by which communications between a MTC application server and MTC UE device can be conducted. Namely, a MTC application server and MTC UE device may communicate MTC data through the EPC network via i) communication over Internet protocol (IP) data or communication over non-IP data. As such, the disclosed subject matter describes an optimization of LTE network interworking for MTC devices by introducing the MTC accumulator to cater to MTC UE devices exchanging IP data.

As indicated above, a MTC UE device that is currently exchanging data with a MTC application server utilizes the data connectivity that is provided by existing LTE networks. The 3GPP standard based architecture may still be characterized as have some of the following shortcomings in the context of MTC data communications. Namely, data connectivity for MTC devices requires the same detailed LTE procedures employed by conventional packet data communications devices despite the fact that only a very small amount of MTC data is communicated between a MTC UE device and a MTC application server.

These existing LTE procedures generate a larger amount of signaling traffic that is communicated for purposes of establishing a communication bearer path. The aforementioned LTE procedures also require a lengthy setup time considering the small amount of MTC data and associated transaction time. In some instances, MTC UE devices can be configured to communicate much smaller data chunks. In some instances, the continued proliferation of MTC devices may necessitate EPC data processing nodes (e.g., SGW, PGW, SCEF, SCS, etc.) to be remodeled or reconfigured to support smaller data packets. This could significantly reduce throughput supported by corresponding data nodes. More specifically, a significant number of MTC UE devices that might end up triggering signaling for enabling a communication path might necessitate the re-dimensioning of the entire LTE network.

In contrast to utilizing existing 3GPP and LTE network architecture to communicate MTC data between a MTC UE device and a MTC application server, the disclosed system introduces the MTC accumulator that is configured to establish a direct connection to an eNodeB and a second direct connection to a MTC application server. Notably, the MTC accumulator is configured to handle designated MTC-based data transfers and communications between MTC UE devices and MTC application servers. Although only a single eNodeB and a single MTC application server is described below as being connected to the MTC accumulator, the MTC accumulator may establish separate and direct secure data tunnels to any number of eNodeBs and MTC application servers without departing from the scope of the disclosed subject matter.

In some embodiments, the implementation of the MTC accumulator compels a number of modifications and changes to conventional data transfers within an EPC network. In particular, the introduction of a MTC accumulator eliminates the need for IP assignment procedures as related to MTC UE devices or terminals. All signaling communications with existing EPC network elements (e.g., PGW, SGW, PCRF, OCS, etc.) in existing call flow procedures for IP assignment are completely unnecessary in the data flow established by the MTC accumulator. For example, the disclosed system permits MTC UE devices to use the RRC protocol to communicate MTC data contained in IP data packets, which in turn are encapsulated within RRC frames. By communicating MTC data in this manner, there is no need for each MTC UE device to trigger the network for IP enablement each time a MTC data transfer to a MTC application server is needed. In some embodiments, the MTC accumulator is configured to enable a secure IP tunnel (e.g., TLS/IPsec tunnel) between each of one or more eNodeBs and the MTC accumulator. Likewise, the MTC accumulator is configured to enable secure IP tunnels between one or more MTC application servers/functions and the MTC accumulator. In some embodiments, the disclosed subject matter utilizes a MTC paging identifier as part of MTC data communicated from a MTC UE device to the MTC accumulator via the eNodeB. In some embodiments, the MTC accumulator is configured to use the MTC paging identifier to conduct trigger paging and device triggering procedures initiated by a connected MTC application server.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example communications environment 100 that includes one or more nodes associated with a fourth generation (4G) network, a long term evolution (LTE) network, an IP Multimedia Core Network Subsystem (IMS) network, a LTE-advanced network, and/or an EPC network. For example, FIG. 1 includes a MTC UE device 102, such as a wireless smart electricity meter, a wireless smart water meter, an Internet of things (IoT) device, a machine-to-machine (M2M) device, or any other like device that is capable of wirelessly communicating with an eNodeB 104 via 4G, LTE, or some other wireless access protocol. In some embodiments, MTC UE device 102 may be configured to wirelessly connect with eNodeB 104 via a wireless radio control link connection (e.g., a RRC connection) in order to facilitate communication with a MTC application server or MTC application function accessible via an external network (e.g., the Internet). MTC UE device 102 may be configured to generate MTC data (e.g., water meter data, electrical meter data, etc.) on a period basis or on demand (e.g., in response to a device triggering message from MTC application server 116). In some embodiments, previous generation of MTC data at MTC UE device 102 may imply that some device triggering message has been received in the past.

Communications environment 100 may also include various network elements that compose an evolved packet system (EPS) network, such as a mobility management entity (MME) 106, a serving gateway (SGW) 108, a home subscriber (HSS) 110, a packet data network gateway (PGW) 114, a MTC accumulator 112, and a MTC application server 116. In some embodiments, communications environment 100 and/or its related nodes may be configured to handle and facilitate traditional multimedia services (e.g., Internet access, VoIP call sessions, VoLTE call sessions, M2M sessions, MTC data transfer sessions, etc.) via established IP based data sessions requested by a MTC user equipment device. As described in more detail below, designated MTC data communications traversing through MTC accumulator 112 are not processed or supported by traditional EPC components, such SGW 108 and PGW 114 (i.e., these components are bypassed using tunnels established by MTC accumulator 112).

MTC data communications between a MTC UE device and a MTC application server are typically established and handled like any other client and server communications over the EPC. For example, dedicated session bearers are established using SGW 108 and PGW 114. In addition, a Service Capability Exposure Function (SCEF) and service capability server (SCS) network elements (not shown) may also be utilized to typically establish a bearer connection between MTC UE device 102 and MTC application server 116. As indicated above, the amount of time required to establish a session for MTC UE device 102 is significantly disproportionate to the time needed to transmit the small amount/size of data to the MTC application server 116. Such measures are inefficient when further considering the frequency in which the miniscule sized MTC data is communicated.

In contrast, some embodiments of the disclosed subject matter enable MTC UE device 102 to communicate with MTC accumulator 112 via an access network (e.g., via a wireless radio link), such as a radio access network (RAN). Exemplary nodes in the access network may include at least one eNodeB 104, which may perform radio access functions. The access network, or nodes therein, may be used to enable communications between MTC UE device 102 and MTC accumulator 112 via eNodeB 104. In some embodiments, one or more eNodeBs 104 may include a MTC inspection engine (IE) 118 that is configured to inspect IP packets (e.g., contained in RRC frames) received from MTC UE device 102. For example, MTC IE 118 may inspect a RRC layer of a received IP packet or RRC frame for a MTC Data Forwarding indicator or flag that indicates that the received IP packet contains MTC data as a payload. In response to detecting a MTC Data Forwarding indicator, MTC IE 118 is configured to send the IP packet directly to MTC accumulator 112 via a persistent secure data tunnel 124 pre-established by MTC accumulator 112. If a MTC Data Forwarding indicator is not found in a received IP packet by MTC IE 118, eNodeB 104 and/or MTC IE 118 is configured to send the IP packet to its destination via other network elements (e.g., PGW 114 and SGW 108) in the EPC core network per 3GPP standards. In some embodiments, MTC IE 118 may also be configured inspect the received RRC packet for a MTC Data Forwarding indicator to determine the RRC payload containing MTC Data from MTC UE device 102 and/or a group of MTC devices. Examples of a MTC paging identifier include an SAE-temporary mobile subscriber identifier (S-TMSI) or an IMSI-GROUP-identifier.

In some embodiments, eNodeB 104 is also configured to forward communications (e.g., session setup request messages, attachment request messages, etc.) that are received from MTC UE device 102 and directed to MME 106. MME 106 is the primary control node for the radio access network (e.g., an activation/deactivation processing as well as selecting a SGW (e.g., SGW 108) and PGW (e.g., PGW 114) for user equipment devices at the initial attachment stage. However, for purposes of the disclosed subject matter, MME 106 is configured for receiving attachment requests from MTC UE device 102 and communicating with HSS 110 in order to authenticate MTC UE device 102 and conducing security procedures. MME 106 is further configured to send a context setup request message with an attachment accept notification to eNodeB 104.

As shown in FIG. 1, MTC accumulator 112 is a network node that has a direct tunnel connection to each of eNodeB 104 and MTC application server 116. In some embodiments, MTC application server 116 includes an application function or application server that is configured to host MTC related service data that may be communicated to or from MTC UE device 102 (e.g., a smart water meter device, a smart electrical meter device, etc.). In some embodiments, MTC accumulator 112 includes a MTC manager 120 that is configured for establishing persistent secure data tunnels 124 and 126 (e.g., TLS/IPsec tunnels) to eNodeB 104 and MTC application server 116. Although only one eNodeB and one MTC application server are depicted in FIG. 1, additional eNodeBs and MTC application servers may be directly linked to MTC accumulator 112 without departing from the scope of the disclosed subject matter. Notably, MTC manager 120 is further configured to manage the connections and MTC data communications conducted between MTC UE devices and MTC application servers and/or functions. MTC manager 120 is further configured to maintain the co-relation between the MTC identity and MTC paging identifier so that any device triggering messages can be provided to the eNodeB for broadcast.

MTC manager 120 may also be configured to maintain a MTC data repository 122 that contains identification information that maps MTC UE devices to MTC sessions and/or MTC application servers. MTC data repository 122 may also be configured to store business related data, such as usage records, billing records, analytics, planning and forecasting data, and other like data associated to a MTC UE device or MTC application server.

MTC application server 116 may be any computing device that hosts a MTC service and communicates with a plurality of MTC UE devices (e.g., MTC UE device 102). In some embodiments, MTC application server 116 may be configured to send a device triggering message (e.g., a device wakeup message) to MTC UE device 102 via the persistent data tunnels 124 and 126 established by MTC accumulator 112. Notably, the device triggering message may include a MTC identity that identifies MTC UE device 102. In some embodiments, the MTC identity is an identifier that a service operator assigns to a MTC UE device and is provided to MTC application server 116. MTC identity remains assigned to a given MTC UE device throughout its subscription validation for the network. Further, MTC identity notably refers to the subscribed identity for MTC UE device 102. MTC accumulator 112 may include a mapping table that includes entries that map MTC identities/identifiers to MTC paging identifiers (e.g., temporary MTC UE identifiers). MTC accumulator 112 forwards the device triggering message to MTC UE device 102 via eNodeB 104 (and data tunnel 124) using the MTC paging identifier that corresponds to the aforementioned MTC identity. In the event MTC UE device 102 has not established radio connectivity with the access network (e.g., eNodeB 104), the device triggering message may be stored/queued at the eNodeB 106 until MTC UE device 102 establishes radio connectivity.

In some embodiments, the device triggering message sent to MTC UE device 102 includes an address of MTC application server 116 and functions as a request for MTC UE device 102 to generate or collect MTC data and to subsequently send the generated and/or collected MTC data to MTC application server 116 via MTC accumulator 112. In other embodiments, MTC UE device 102 is previously provisioned with the address of MTC application server 116.

In some embodiments, MTC application server 116 may utilize device triggering messages to direct MTC UE device 102 to execute UE firmware or software upgrades. In such an event, caching of this paging request (i.e., device triggering message) at eNodeB 104_until MTC UE device 102 awakens and established a radio link with eNodeB 104. Further, this device trigger message is a logical extension for supporting device upgrades (or an information to MTC UE device 102 that MTC applications server 116 attempted to communicate some specific data to MTC UE device 102).

It will be appreciated that FIG. 1 and its related description are for illustrative purposes and that each of eNodeB 104 and MTC accumulator 112 may include additional and/or different modules, components, or functionality. Further, MTC IE 118, MTC manager 120, and/or related functionality described herein may be associated with different and/or additional nodes or entities.

Figure 2:
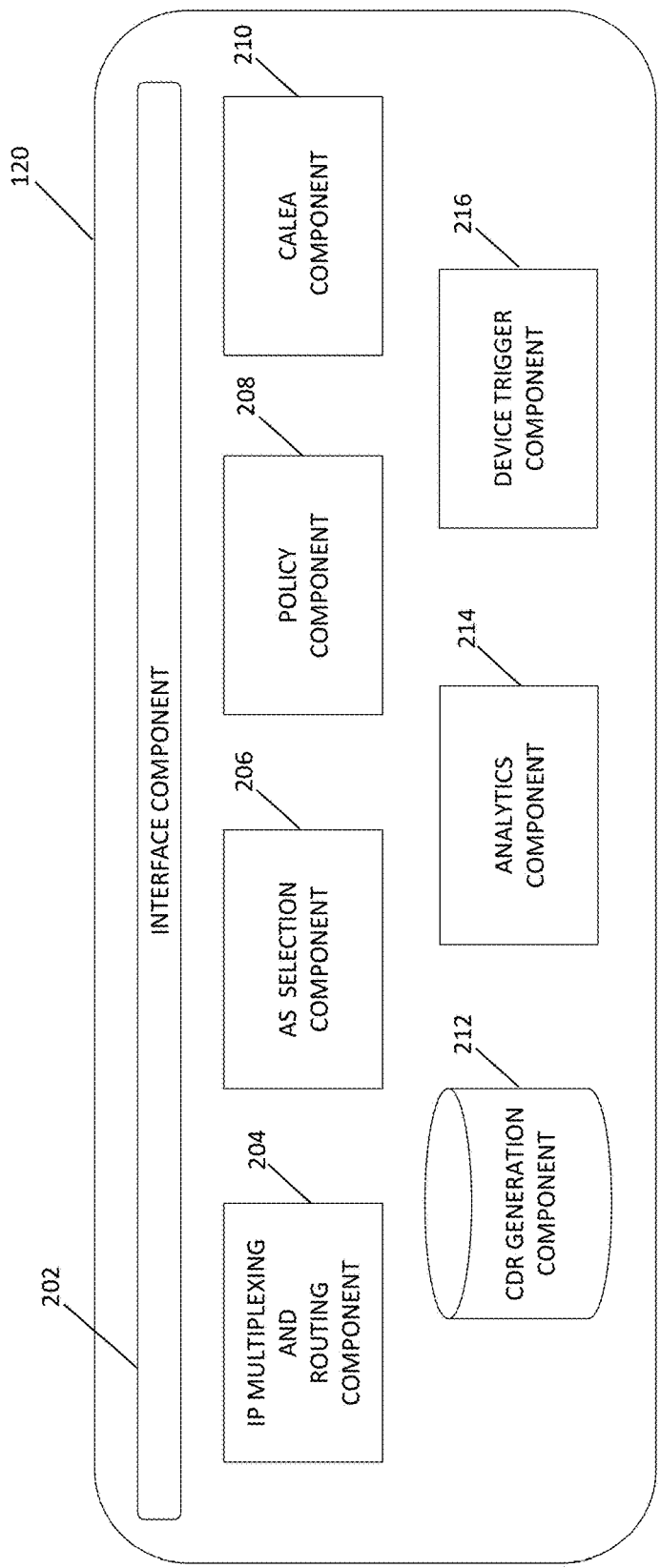
FIG. 2 is a block diagram illustrating an exemplary machine type communication (MTC) manager in accordance to an embodiment of the subject matter described herein.

FIG. 2 is a block diagram illustrating an exemplary machine type communication (MTC) manager 120 in accordance to an embodiment of the subject matter described herein. As shown in FIG. 2, MTC manager 120 includes an interface component 202, an IP multiplexing and routing component 204, an application server selection component 206, a policy component 208, a Communications Assistance for Law Enforcement Act (CALEA) component 210, a call detail record (CDR) generation component 212, an analytics component 214, and a device trigger component 216. In some embodiments, each of MTC manager 120 and/or components 202-216 includes software components that are stored in memory (not shown) of MTC accumulator 112 and executed by at least one processor (not shown) of MTC accumulator 112.

In some embodiments, interface component 202 may include any component that enables secure interface connectivity towards an eNodeB or a MTC application server. For example, interface component 202 is responsible for communicating the signaling messages that establish persistent secure data tunnel 124 to eNodeB 104 and the signaling messages that establish persistent secure data tunnel 126 to MTC application server 116 (see FIG. 1). In some embodiments, interface component 202 is configured to establish persistent TLS/IPsec tunnels to eNodeB 104 and/or MTC application server 116.

IP Multiplexing and Routing component 204 is configured to receive IP data packets that include a payload containing MTC data. In some embodiments, IP Multiplexing and Routing component 204 may be configured to strip or extract the MTC data from IP packets and subsequently forward the MTC data to other internal components in MTC manager 120 for further processing.

Application server selection component 206 is configured to select a MTC application server based on RRC information that identifies the destination MTC application server. In some embodiments, application server selection component 206 parses the MTC data in the plain IP packet data and obtains the address of the destination MTC application server (e.g., MTC AS 116).

CALEA component 210 is configured to inspect the plain IP packet produced by component 204 for a particular source address or destination address. In response to detecting a relevant IP packet, CALEA component 210 may transfer the lawfully intercepted MTC data (e.g., a copy of the IP packet or MTC data) included in the identified IP packet to a designated law enforcement network entity or server. Likewise, CDR generation component 212 is configured to generate a CDRA with timestamp information, MTC data size, and any other information that can be used for conducting an offline correlation between MTC UE device 102 and MTC application server 116.

In some embodiments, analytics component 214 is configured to generate reports and analytics based on traffic patterns communicated via MTC accumulator 112. Device trigger component 216 is configured to provide a mechanism for initiating MTC accumulator device wake-up and upgrade scheduling functions.

Figure 3:
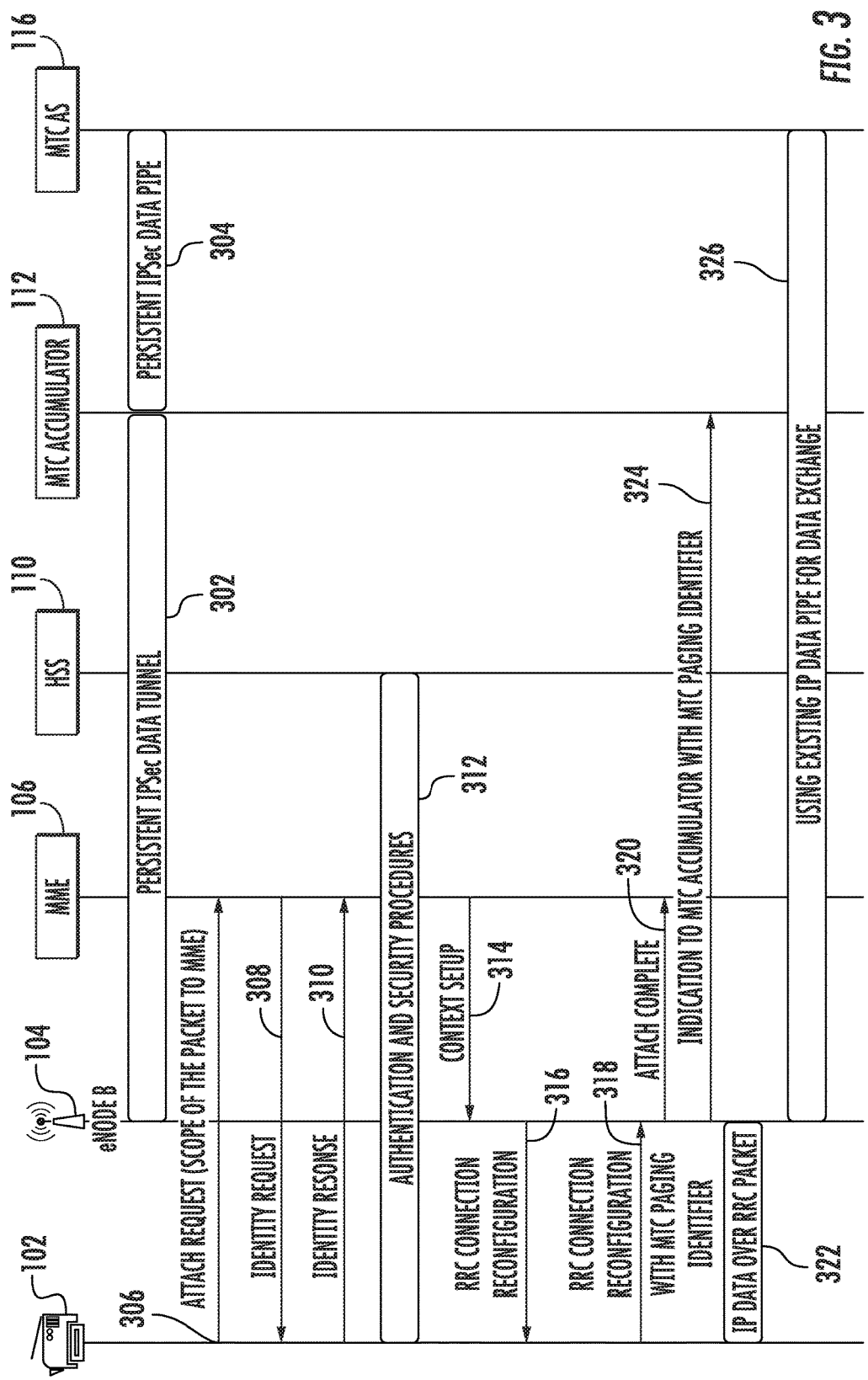
FIG. 3 illustrates a signaling diagram related to the optimization of machine type communication (MTC) device signaling in accordance to an embodiment of the subject matter described herein.

FIG. 3 illustrates a signaling diagram related to the optimization of MTC device signaling in accordance to an embodiment of the subject matter described herein. In FIG. 3, MTC accumulator 112 has established a persistent secure data tunnel (e.g., bearer path tunnel) with each of eNodeB 104 and MTC application server 116. For example, MTC accumulator 112 may establish a direct TLS/IPsec data tunnel 302 with eNodeB 104 that is capable of supporting SCTP/TCP packet communications. Notably, data tunnel 302 is a direct bearer path between MTC accumulator 112 and eNodeB 104 and does not utilize or traverse other EPC network elements, such an MME, PGW, SGW, SCS, and the like, to facilitate communication of MTC data. Similarly, MTC accumulator 112 may establish a second TLS/IPsec data tunnel 304 with MTC application server 116 that is capable of supporting SCTP/TCP packet communications. Further, data tunnel 304 is a direct bear path between MTC accumulator 112 and MTC application server 116 and also does not utilize or traverse EPC network elements, such the MME, PGW, SGW, SCS, and the like, to facilitate communication of MTC data.

FIG. 3 further depicts MTC UE device 102 sending an attach request message 306 (e.g., a session setup request message) to an MME 106 via eNodeB 104 in order to request registration with a core network that can support a communications session (e.g., a MTC data session) between MTC UE device 102 and MTC application server 116. In some embodiments, the attach request may include device property information that identifies device 102 as a MTC UE device. MTC UE device 102 may facilitate the communication by initially establishing a radio access control link with eNodeB 104 using any air interface protocol, such as RRC protocol. After requesting and receiving UE identification information from MTC UE device 102 via identity request and response messages 308-310, MME 106 may query and access HSS 110 for purposes of authenticating MTC UE device 102 and establishing security measures for the requested session.

In some embodiments, MME 106 may be configured to determine that device 102 is a MTC UE device. For example, MME 106 may be configured to inspect and find the device property information included in an attach request message (e.g., attach request message 306) from device 102. Namely, the device property information may comprise an indication that the UE device is designated as a MTC UE device. Alternatively, MME 106 may receive the device property information from HSS 110 during the authentication process (e.g., procedures 312 in FIG. 3). In response to determining that device 102 is a MTC UE device, MME 106 may be configured to withhold sending a create session request message to a PGW and/or SGW. Instead of sending a create session request message to a PGW or other EPC element per 3GPP standards, MME 106 responds to the successful attachment/registration of MTC UE device 102 by sending a context setup request message 314 that contains an attach accept notification to eNodeB 104.

At this stage, eNodeB 104 may be configured to direct a RRC control message, such as a RRC connection reconfiguration request message 316, to MTC UE device 102. In response, MTC UE device 102 sends a RRC connection reconfiguration response message 318 that includes a MTC paging identifier to eNodeB 104. Notably, the MTC paging identifier may be a temporary identifier that identifies MTC UE device 102 and has been previously assigned and provided to MTC UE device 102 by MME 106. The eNodeB may utilize the MTC paging identifier (e.g., S-TMSI) to schedule a paging request to the MTC UE device. After receiving RRC connection reconfiguration response message 318, eNodeB 104 sends an attach complete message to MME 106.

Once the attachment procedure is complete, a wireless radio bearer link 322 is established between MTC UE device 102 and eNodeB 104. MTC UE device 102 may then send MTC data (e.g., data that MTC has been monitoring and/or generating) intended for MTC application server 116 to eNodeB 104 via wireless radio bearer link 322. The MTC data may be directed to MTC application server 116 in response to a MTC data request sent by MTC application server 116 or may be sent to MTC application server 116 as an unsolicited MTC data message sent in accordance to a predefined schedule stored on the MTC UE device 102.

In some embodiments, the MTC data may be communicated as payload data contained in RRC packets and/or RRC frames. The RRC packets or frames may also include a MTC Data Forward indicator in the RRC layer that is detected by eNodeB 104. In addition, the MTC data in the RRC packets may include the MTC Data with MTC paging identifier identifying MTC UE device 102. In some embodiments, the MTC paging identifier is a S-TMSI corresponding to MTC UE device 102. Notably, eNodeB 104 is configured to forward the MTC Data to MTC accumulator 112 in the event the MTC Data Forward indicator is detected.

After receiving MTC data (via packet or packet flow 324) from eNodeB 104, MTC accumulator 112 establishes a session connection between MTC application server 116 (which is identified by MTC Identity information in a packet or packet flow 324) and eNodeB 104. Notably, the established session connection 326 is facilitated by the pre-established IPsec data tunnels 302 and 304 previously established by MTC accumulator 112. These persistent data tunnels 302 and 304 are applicable for all sessions established between eNodeB 104 and MTC accumulator 112 and between MTC application server 116, respectively. In some embodiments, data tunnels 302 and 304 may be non-IPsec based tunnels that are based on operator requirements.

After the wireless radio bearer link 322 is established, eNodeB 104 is configured to receive RRC frames containing MTC data sent by MTC UE device 102 via wireless radio bearer link 322 (e.g., a radio bearer path). In some embodiments, the MTC data sent by MTC UE device 102 is contained in a RRC layer within transmitted RRC frames that encapsulate IP packets with MTC data payloads. Each of the RRC frames containing the MTC data may include a RRC layer indication (e.g., a "MTC-Data-forwarding" indicator) that is detected by eNodeB 104 (and/or MTC IE 118 shown in FIG. 1). In response to detecting the "MTC-Data-forwarding" indicator, eNodeB 104 is configured to forward the MTC Data embedded in the RRC packet/frame to MTC accumulator 112 via data tunnel 302. If an "MTC-Data-forward" indicator" is not found or detected in the RRC packet or frame, eNodeB 104 forwards the MTC Data (e.g., IP packet) to other EPC network elements (e.g., SGW, PGW, SCS, etc.) per 3GPP standards.

After MTC accumulator 112 receives the MTC Data containing the MTC paging identifier, MTC accumulator 112 may obtain the requested destination MTC application server address from the MTC data. After processing the MTC data, MTC accumulator 112 may be configured to identify the MTC application server based on the processed MTC data (which contains the address of MTC application server 116).

Figure 4:
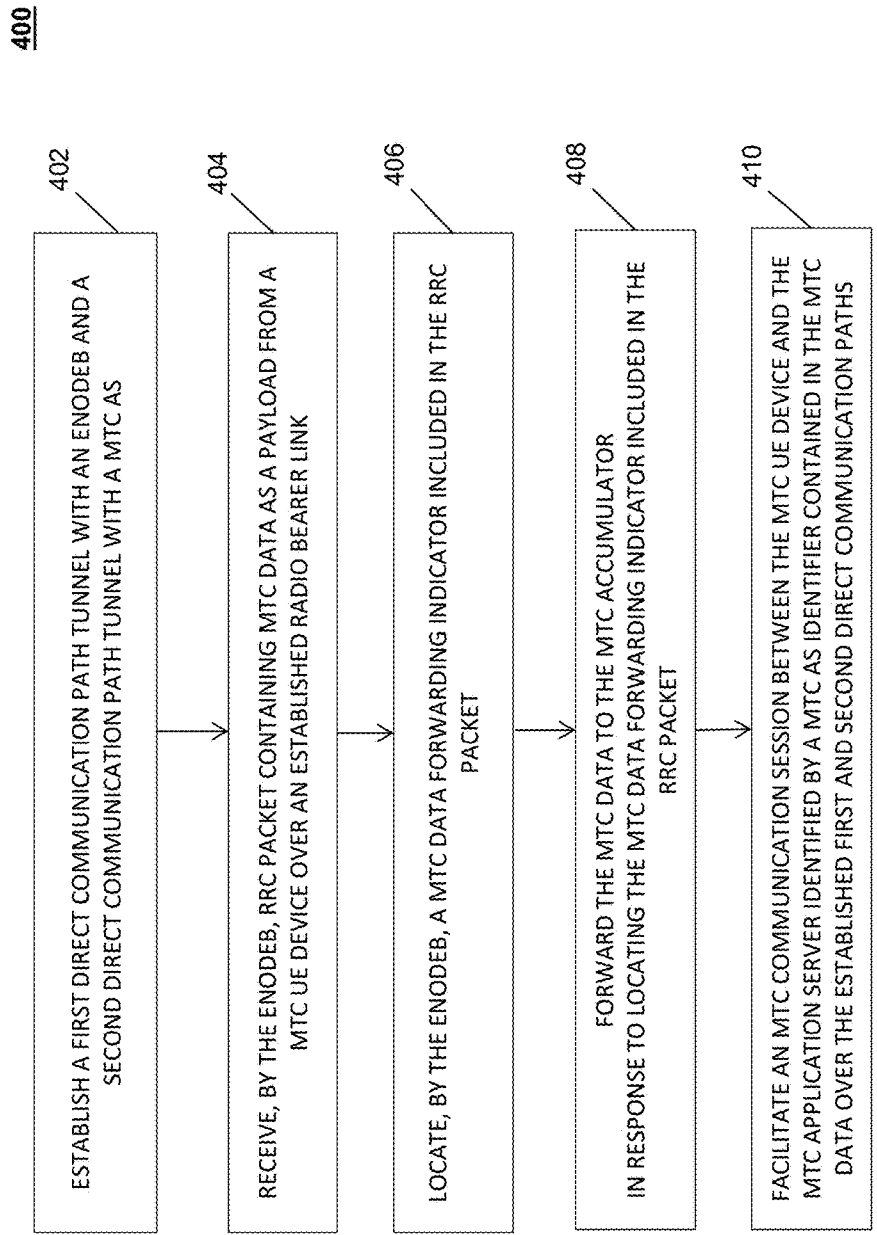
FIG. 4 depicts an example method for optimizing machine type communication (MTC) device signaling in accordance to an embodiment of the subject matter described herein.

FIG. 4 depicts an example method for optimizing machine type communication (MTC) device signaling in accordance to an embodiment of the subject matter described herein. In some embodiments, example method 400 described herein, or portions thereof, may be performed at or performed by eNodeB, MTC manager, and/or another module or node. For example, method 400 may be an algorithm that is stored in memory and executed by a processor within one or more of these aforementioned network components.

In particular, method 400 as illustrated in FIG. 4 depicts exemplary steps conducted by an eNodeB and a MTC accumulator device to optimize MTC device signaling. For example, referring to method 400, in step 402, a first and second communication tunnels are established by a MTC accumulator. In some embodiments, the MTC establishes a first persistent IPsec tunnel with a MTC application servers and a second persistent IPsec tunnel with an eNodeB. The MTC accumulator may be configured to store a record that maps each persistent IPsec tunnel to its respective terminating endpoint (e.g., an eNodeB identifier/address, a MTC application server identifier/address, etc.).

In step 404, a RRC packet is received by the eNodeB that contains MTC data as a payload from a MTC UE device over an established radio bearer link. In some embodiments, the MTC UE device begins sending MTC data contained in a RRC packet to the eNodeB over an established radio bearer link in accordance to a predefined schedule or in response to a device trigger message sent by a MTC application server.

In step 406, a MTC data forwarding indicator contained in the RRC packet received by the eNodeB is located. The RRC packet may include a "MTC Forward data" indicator or flag that can be detected by the MTC IE in the eNodeB.

In step 408, a MTC Data is forwarded to the MTC accumulator in response to locating (by the eNodeB and/or MTC IE) the MTC data forwarding indicator included in the RRC packet. Notably, in the event the MTC IE detects the MTC Forward data indicator in the RRC layer of the received RRC packet (or RRC frame), the eNodeB and/or MTC IE is configured to directly forward the flagged MTC Data to the MTC Accumulator via a pre-established tunnel (e.g., see step 402). In particular, the MTC data is sent in a manner that bypasses other network elements (e.g., SGW, PGW, SCS, etc.) in the EPC network and is sent directly to the MTC accumulator.

In step 410, a MTC communication session between the MTC UE device and the MTC application server identified by a MTC application server identifier contained in the MTC data over the established first and second direct communication paths facilitated by the MTC accumulator by way of a persistent secure data tunnel, such as a TLS/IPsec tunnel. Upon receiving the MTC Data from the eNodeB, MTC accumulator extract a destination address of a requested MTC application server, and send the MTC data directly to the identified MTC application server via the pre-established second secure data tunnel (e.g., see step 402). Specifically, the MTC data is directly sent to the MTC application server as IP packet data (e.g., via SCTP/TCP) via the persistent secure data tunnel and notably bypasses other network elements (e.g., SGW, PGW, SCEF, SCS, etc.) in the EPC network.

In some embodiments, the disclosed subject matter further comprises a MTC accumulator that is configured to extract the MTC application server destination address from the received MTC data and to forward the MTC data to the MTC application server.

In some embodiments, the disclosed subject matter further comprises a method wherein the established radio bearer is a direct RRC connection between the MTC UE device and the eNodeB.

In some embodiments, the disclosed subject matter further comprises a MTC accumulator that maintains a MTC data repository that is used to map MTC paging identifiers identifying MTC UE devices to MTC application server identifiers.

In some embodiments, the disclosed subject matter further comprises a second direct communication path tunnel, which is established between the MTC accumulator and the MTC application server, that is an IPsec tunnel established over a SGi interface.

In some embodiments, the disclosed subject matter further comprises an eNodeB that is configured to direct the MTC Data (e.g., IP payload) to a packet gateway in response to failing to locate a MTC data forwarding indicator in the RRC packet (e.g., a MTC data forwarding indicator is absent from the RRC packet).

In some embodiments, the disclosed subject matter further comprises MTC data, which is forwarded to the MTC accumulator, that includes a MTC paging identifier that identifies the MTC UE device In some embodiments, the disclosed subject matter further comprises a method wherein the MTC paging identifier includes an SAE-Temporary Mobile Subscriber Identity (S-TMSI).

It should be noted that each of eNodeB 104 and MTC accumulator 112, and/or functionality described herein may constitute a special purpose computing device. Further, eNodeB 104 and MTC accumulator 112, MTC IE 118, MTC manager 120, and/or functionality described herein can improve the technological field of network communications conducted by MTC device (e.g., M2M devices, IoT devices, etc.). For example, the disclosed subject matter affords the technical advantage of providing an improved setup procedure that includes existing LTD authentication procedures through a MME with a HSS database but notably does not wait for session creation at the SGW/PGW and through SGi. Thus, this just closed the subject matter provides faster session establishment time and faster closure of session providing resources for more MTC devices or for other devices/services (e.g., Internet APNs and the like). The disclose subject matter also allows for data transfer through the eNodeB using the RRC layer which permits the eNodeB to maintain security while sending data to the MTC accumulator. In some scenarios, the MTC accumulator may also be configured to provide necessary regulatory lawful intercept data to law enforcement agencies. Further, the MTC accumulator It will be understood that various details of the subject matter described herein may be changed without departing from the scope of the subject matter described herein. Furthermore, the foregoing description is for the purpose of illustration only, and not for the purpose of limitation.

What is claimed is:

1. A method comprising:
    establishing, by a machine type communication (MTC) accumulator, a first direct communication path tunnel with an eNodeB and a second direct communication path tunnel with a MTC application server (AS);
    receiving, by the eNodeB, radio resource control (RRC) packet containing MTC data as a payload from a MTC user equipment (UE) device over an established radio bearer link;
    locating, by the eNodeB, a MTC data forwarding indicator included in the RRC packet;
    in response to locating the MTC data forwarding indicator included in the RRC packet, forwarding the MTC Data to the MTC accumulator; and
    facilitating, by the MTC accumulator, a MTC communication session between the MTC UE device and the MTC application server identified by a MTC application server identifier contained in the MTC data over the established first and second direct communication paths, wherein the MTC accumulator maintains a MTC data repository that is used to map MTC paging identifiers identifying MTC UE devices to MTC application server identifiers.

2. The method of claim 1 wherein the eNodeB is configured to extract the MTC data from the RRC packet prior to sending the MTC data to the MTC application server.

3. The method of claim 1 wherein the established radio bearer link is a direct RRC connection between the MTC UE device and the eNodeB.

4. The method of claim 1 wherein the second direct communication path tunnel established between the MTC Accumulator and the MTC application server is an IPsec tunnel established over a SGi interface.

5. The method of claim 1 wherein the eNodeB is configured to direct the MTC data to a packet gateway in response to failing to locate a MTC data forwarding indicator in the RRC packet.

6. The method of claim 1 wherein the MTC data forwarded to the MTC accumulator includes a MTC paging identifier that identifies the MTC UE device.

7. A system comprising:
a machine type communication (MTC) accumulator configured for establishing a first direct communication path tunnel with an eNodeB and a second direct communication path tunnel with a MTC application server (AS);
the eNodeB configured to receive a radio resource control (RRC) packet containing MTC data as a payload from a MTC user equipment (UE) device over an established radio bearer link, to locate a MTC data forwarding indicator included in the RRC packet, to forward the MTC Data to the MTC accumulator in response to locating the MTC data forwarding indicator included in the RRC packet;
wherein a MTC communication session between the MTC UE device and the MTC application server identified by a MTC application server identifier contained in the MTC data is facilitated by the MTC accumulator over the established first and second direct communication paths; and
wherein the MTC accumulator maintains a MTC data repository that is used to map MTC paging identifiers identifying MTC UE devices to MTC application server identifiers.

8. The system of claim 7 wherein the eNodeB is configured to extract the MTC data from the RRC packet prior to sending the MTC data to the MTC application server.

9. The system of claim 7 wherein the established radio bearer link is a direct RRC connection between the MTC UE device and the eNodeB.

10. The system of claim 7 wherein the second direct communication path tunnel established between the MTC Accumulator and the MTC application server is an IPsec tunnel established over a SGi interface.

11. The system of claim 7 wherein the eNodeB is configured to direct the MTC data to a packet gateway in response to failing to locate a MTC data forwarding indicator in the RRC packet.

12. The system of claim 7 wherein the MTC data forwarded to the MTC accumulator includes a MTC paging identifier that identifies the MTC UE device.

13. A non-transitory computer readable medium comprising computer executable instructions embodied in the non-transitory computer readable medium that when executed by at least one processor of at least one computer cause the at least one computer to perform steps comprising:
establishing, by a machine type communication (MTC) accumulator, a first direct communication path tunnel with an eNodeB and a second direct communication path tunnel with a MTC application server (AS);
receiving, by the eNodeB, a radio resource control (RRC) packet containing MTC data as a payload from a MTC user equipment (UE) device over an established radio bearer link;
locating, by the eNodeB, a MTC data forwarding indicator included in the RRC packet;
in response to locating the MTC data forwarding indicator included in the RRC packet, forwarding the MTC Data to the MTC accumulator; and
facilitating, by the MTC accumulator, a MTC communication session between the MTC UE device and the MTC application server identified by a MTC application server identifier contained in the MTC data over the established first and second direct communication paths, wherein the MTC accumulator maintains a MTC data repository that is used to map MTC paging identifiers identifying MTC UE devices to MTC application server identifiers.

14. The non-transitory computer readable medium of claim 13 wherein the eNodeB is configured to extract the MTC data from the RRC packet prior to sending the MTC data to the MTC application server.

15. The non-transitory computer readable medium of claim 13 wherein the established radio bearer link is a direct RRC connection between the MTC UE device and the eNodeB.

16. The non-transitory computer readable medium of claim 13 wherein the second direct communication path tunnel established between the MTC accumulator and the MTC application server is an IPsec tunnel established over a SGi interface.

17. The non-transitory computer readable medium of claim 13 wherein the eNodeB is configured to direct the MTC data to a packet gateway in response to failing to locate a MTC data forwarding indicator in the RRC packet.

* * * * *